Dec. 7, 1948.  V. J. TENETY  2,455,624
DRIVE OR SPROCKET CHAIN
Filed April 2, 1946
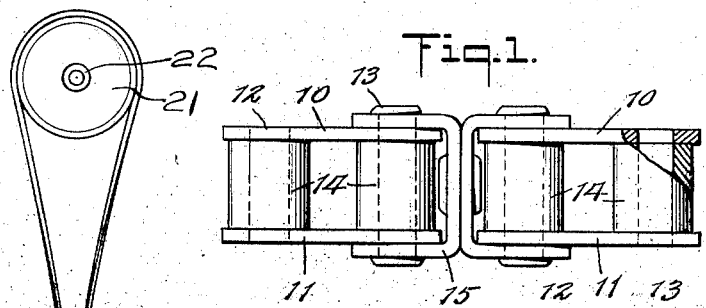
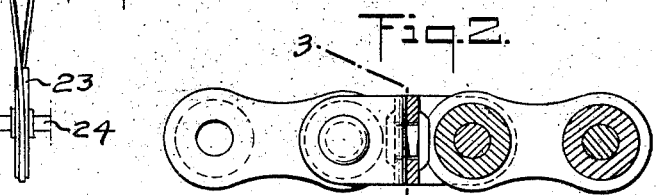
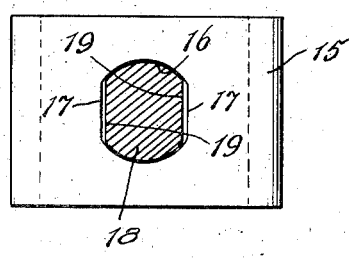 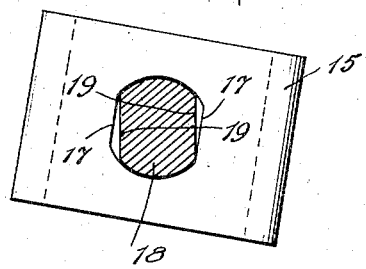
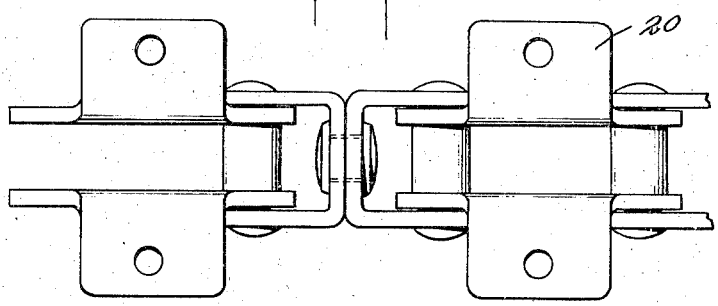
INVENTOR
VINCENT J. TENETY
BY Daily & Daily
ATTORNEYS Patented Dec. 7, 1948

2,455,624

UNITED STATES PATENT OFFICE 2,455,624

DRIVE OR SPROCKET CHAIN

Vincent J. Tenety, Jersey City, N. J., assignor to East Coast Ship Yards, Cliffside Park, N. J., a corporation of New Jersey Application April 2, 1946, Serial No. 658,997

3 Claims. (Cl. 74—246)

The present invention relates to a drive chain and particularly to a drive chain of the sprocket type, which may in some instances be provided with a plurality of platforms to thereby form a conveyor chain.

More particularly still, the invention comprehends a drive chain capable of driving a sprocket wheel or the like in one plane from another driving sprocket wheel in a different plane.

It is an object of the invention to provide a drive chain for utilization with sprocket wheels which chain shall be capable of driving a sprocket located in one plane from a sprocket wheel located in a different plane.

It is another object of the invention to provide such a driving chain which may be utilized as a conveyor.

It is a further object of the invention to provide a driving chain of the type described, which is simple in construction and positive in operation.

Other objects and features of the invention will appear when the following description is considered in connection with the appended drawings, in which—

Figure 1 is a top-plan view of two adjacent links of a sprocket chain constructed in accordance with my invention;

Figure 2 is a side elevation of the chain of Figure 1. A portion of this figure, however, is in section to more clearly illustrate the construction of the chain links;

Figure 3 is a sectional view of the chain of Figures 1 and 2, the section being taken on the plane of the line 3—3 of Figure 2. In this view, the parts are shown as they would appear while the chain was passing around the sprocket wheel and adjacent links were in the same relative position, that is not tilted with respect to one another;

Figure 4 is a cross-sectional view similar to Figure 3, showing the parts in the position which they take as the chain passes between the sprocket wheels and the plane of its motion is altered.

Figure 5 is a view generally similar to Figure 1 but showing the links provided with lugs on which a platform or belt may be fastened in order that a conveyor chain may be formed, and Figure 6 is a schematic diagram illustrating a chain of the type described in operation to drive a sprocket wheel from another sprocket wheel having its axis in a different plane from that of the first one.

Referring now to the drawings, there are shown in Figure 1 a pair of links of a sprocket chain, each link comprising the side members or plates 10 and 11 between which extend the pins 12 and 13 each of which forms a support for a roller 14. Each chain link is provided at each end with a U-shaped member 15, the arms of the U of which are provided with holes so that the member may be fastened to the plates 10 and 11 with the respective pin 12 or 13 extending through the arms. At the central portion of the base of each U-shaped piece 15, a hole 16 is provided which is generally round, but is provided with two flattened opposite surfaces 17. Extending through the holes 16 in two abutting U-shaped pieces 15 is a rivet or the like 18 which is generally circular in cross section, but is provided with the two flattened opposite surfaces 19 which are aligned with flattened surfaces 17. Since the diameter of the pin or rivet 18 transverse to the flattened surfaces 19 is less than the diameter across the flattened surfaces 17 of the hole 16, it will be clear that there will be limited relative rotational movement between adjacent links.

In general, the space left between the flattened surfaces 17 and 19 is such that adjacent chain links may rotate approximately 10 degrees with respect to each other, and consequently, the chain may be utilized in such cases as those in which one of the sprocket wheel shafts is at 90 degrees to the other, it being only necessary that there be sufficient distance between the shafts so that the complete 90 degrees of the rotation of links may be accomplished during the movement between the sprockets without any tilting of the links while they are on the sprockets, which of course would be impossible.

The chain thus far described may be modified for example as shown in Figure 5 by providing the side pieces 10 and 11 thereof with outstanding bent-over lugs 20 on which a flexible belt or a plurality of platforms may be fastened in order to form a means for utilizing the chain to convey various articles. If desirable, the lugs 20 or the platforms affixed thereto will be provided with fastening elements or other devices for holding articles on the conveyor during the passage from one point along the traverse of the belt or chain to another.

As is shown in Figure 6, a chain such as previously described may be utilized to drive a sprocket wheel 21 on a shaft 22 from a sprocket wheel 23 on a shaft 24, which is at right angles to the shaft 22. By virtue of the possible relative rotation of each link with respect to each other link, the plane in which the links lie will constantly shift during its traverse between the sprocket wheels 21 and 23.

While I have described a preferred form of my invention, it will be understood that other forms may be devised which utilize the same principles and similar construction. Consequently, I wish to be limited not by the foregoing description which was given for purposes of illustration only, but on the contrary to be limited solely by the appended claims.

What is claimed is:

1. A drive chain for transmitting movement from a sprocket in one plane to a sprocket in a different plane, said chain comprising a plurality of links each link having a U-shaped member across each end thereof, each said U-shaped member being provided with a bore therethrough at the center of its base, and pivot means extending through said portions whereby each said link may rotate relatively to the adjacent links.

2. A drive chain for transmitting movement from a sprocket in one plane to a sprocket in a different plane, said chain comprising a plurality of links each link having a U-shaped member across each end thereof, each said U-shaped member being provided with a bore therethrough, at the center of its base, pivot means extending through said portions whereby each said link may rotate relatively to the adjacent links and means for limiting the amount of rotation of the links.

3. A drive chain for transmitting movement between two sprockets located in different planes, said chain comprising a plurality of links, each link having a U-shaped member across each end thereof, each said member being provided with a hole in the center of the base of the U, said holes being flattened on their opposite sides, pivot means extending through the holes of said adjacent U-shaped arms said pivot means being flattened on opposite faces thereof, the diameter across the said flattened faces of said pivot means being less' than the diameter across the flattened faces of said holes, whereby the links may rotate relatively to the adjacent links to an extent limited by the cooperating flattened faces of the said holes and pivot means.

VINCENT J. TENETY.

REFERENCES CITED

The following references are of record in the file of this patent:

UNITED STATES PATENTS

| Number | Name | Date |
|---|---|---|
| 443,769 | Hurford | Dec. 30, 1890 |
| 1,453,702 | Carstens | May 1, 1923 |
| 1,841,592 | Edwards | Jan. 19, 1932 |